(12) United States Patent
Hochman

(10) Patent No.: US 10,356,377 B2
(45) Date of Patent: Jul. 16, 2019

(54) CONTROL AND DISPLAY SYSTEM WITH SYNCHRONOUS DIRECT VIEW VIDEO ARRAY AND INCIDENT KEY LIGHTING

(71) Applicant: Revolution Display, LLC, Glendale, CA (US)

(72) Inventor: Jeremy Hochman, Walnut, CA (US)

(73) Assignee: Production Resource Group, L.L.C., Armonk, NY (US)

( * ) Notice: Subject to any disclaimer, the term of this patent is extended or adjusted under 35 U.S.C. 154(b) by 0 days.

(21) Appl. No.: 16/025,685

(22) Filed: Jul. 2, 2018

(65) Prior Publication Data
US 2018/0324398 A1    Nov. 8, 2018

Related U.S. Application Data

(60) Division of application No. 15/644,386, filed on Jul. 7, 2017, now Pat. No. 10,015,460, which is a continuation of application No. 15/260,559, filed on Sep. 9, 2016, now Pat. No. 9,706,183, which is a division of application No. 14/248,212, filed on Apr. 8, 2014.

(51) Int. Cl.
| | |
|---|---|
| *H04N 9/12* | (2006.01) |
| *H04N 9/44* | (2006.01) |
| *H04N 9/75* | (2006.01) |
| *H05B 33/08* | (2006.01) |
| *H05B 37/02* | (2006.01) |

(52) U.S. Cl.
CPC ............ *H04N 9/75* (2013.01); *H04N 9/12* (2013.01); *H04N 9/44* (2013.01); *H05B 33/086* (2013.01); *H05B 33/0863* (2013.01); *H05B 33/0872* (2013.01); *H05B 37/029* (2013.01)

(58) Field of Classification Search
CPC ... H04N 9/75; H04N 9/12; H04N 9/44; H05B 33/086; H05B 33/0863; H05B 33/0872; H05B 33/029
See application file for complete search history.

(56) References Cited

U.S. PATENT DOCUMENTS

| | | | | |
|---|---|---|---|---|
| 2007/0091111 | A1* | 4/2007 | Gutta | H04N 5/58 345/591 |
| 2010/0238262 | A1* | 9/2010 | Kurtz | H04N 7/142 348/14.01 |

* cited by examiner

*Primary Examiner* — Michael E Teitelbaum
(74) *Attorney, Agent, or Firm* — Downs Rachlin Martin PLLC

(57) ABSTRACT

Various embodiments relate to an apparatus for controlling a lighting device. A light control circuit can use a controlled lighting sequence control and drive viewed sections of a lighting device to display chroma key color or emit infrared light, while driving other unviewed portions of the lighting device to display ambient and incident lighting. The viewed and unviewed lighting sections can be based on the field of vision of an image capture device and can change in relation to movements of the image capture device. A sensor can make measurements to determine to field of vision of the image capture device and can be used to generate or modify the controlled lighting sequence. An image processing circuit can generate a composite image using the chroma key while maintaining the subjects that are captured using ambient and incident lighting.

11 Claims, 4 Drawing Sheets

CONTROL AND DISPLAY SYSTEM WITH SYNCHRONOUS DIRECT VIEW VIDEO ARRAY AND INCIDENT KEY LIGHTING

RELATED APPLICATION DATA

This application is a divisional of U.S. patent application Ser. No. 15/644,386, filed on Jul. 7, 2017, and titled "CONTROL AND DISPLAY SYSTEM WITH SYNCHRONOUS DIRECT VIEW VIDEO ARRAY AND INCIDENT KEY LIGHTING," now allowed, which application is a continuation of U.S. patent application Ser. No. 15/260,559, filed on Sep. 9, 2016, and titled "CONTROL AND DISPLAY SYSTEM WITH SYNCHRONOUS DIRECT VIEW VIDEO ARRAY AND INCIDENT KEY LIGHTING", now U.S. Pat. No. 9,706,183, which application is a divisional of U.S. patent application Ser. No. 14/248,212, filed on Apr. 8, 2014, and titled "AUTOMATIC CHROMA KEY BACKGROUND GENERATOR WITH INCIDENT KEY LIGHTING." Each of these applications is incorporated herein by reference in its entirety.

FIELD OF THE INVENTION

Various exemplary embodiments disclosed herein relate generally to video production. Specifically, exemplary embodiments relate to lighting control for video effects.

BACKGROUND

Chroma key depositing (i.e., chroma keying) is a technique used in image and video production to produce a composite image. A portion of a target image including a subject is replaced with another image; in order to ease the replacement of the portion of the target image, that portion is "keyed" with a single color that is distinguishable from the rest of the image and is replaced with the second image. During video production, a solid green or blue (to be furthest away from natural skin tone) are used as background. During post-production the background color is replaced with another background to produce the composite image.

Recently, solid matte backgrounds have been replaced with light-emitting diode (LED) array lighting systems. Some LED systems replace existing lights, such as LED-mounted spotlights or on-camera flashes. In some instances, LED arrays have also been used as background to supplement or even replace a chroma key background for a composite image. However, unless the LED array is emitting the same color as the chroma key background, the LED array must be completely out of the camera's field of vision in order for the post-production processing of the chroma key background to be effective.

In view of the foregoing, it would be desirable to incorporate LED lighting arrays in chroma key images and videos. In particular, it would be desirable to use LED lighting within a camera's field of vision in chroma key video capture.

SUMMARY OF THE DISCLOSURE

In light of the present need for controlled chroma key and incident lighting, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments relate to a light control apparatus for controlling a lighting device. The light control apparatus can include a lighting device comprising a viewed portion of lights and an unviewed portion of lights and a light control circuit that controls the viewed and unviewed portion of the LED array based on a controlled lighting sequence. The controlled lighting sequence can include an ambient light profile. In various aspects, the controlled lighting sequence also includes a chroma key color profile and/or an incident light profile.

In various aspects, the lighting device can include an LED array and/or a projector. In various aspects, the light control apparatus can also include a video capture device that records a first image, wherein only the viewed portion of the lighting device is in a field of vision of the video capture device. In an aspect, the lighting device can include one or more spotlight lighting sections that displays the incident light profile.

In various aspects, the light control apparatus can also include a sensor that records light measurements, wherein the light control circuit determines the field of vision of the image capture device based on the light measurements. In various aspects, the light control apparatus can also include a user interface connected to the light control circuit that sends signals to the light control circuit to modify the controlled lighting sequence. In an aspect, the lighting control circuit generates the incident light profile based the light measurements.

In various aspects, the light control apparatus can also include an image storage device that includes at least a reference image. In various aspects, the light control apparatus can also include an image processing circuit that generates a composite image based on the first image and the reference image. In an aspect, the image storage device stores images associated with a target GPS coordinate.

In various aspects, the light control apparatus can operate such that at least the viewed portion of the lighting device displays a chroma key color and/or emit infrared light. In an aspect, only the viewed portion of the lighting device displays the chroma key color and/or emits infrared light.

In various aspects, the light control apparatus can operate such that the unviewed portion of the lighting device displays the ambient light profile. In an aspect, only the unviewed portion of the lighting device displays the ambient light profile. In various aspects, the light control apparatus can operate such that the lighting device alternates between displaying the chroma key color and/or infrared light and the ambient light profile.

It should be apparent that, in this manner, various exemplary embodiments enable automatic chroma key and incident lighting. Particularly, by controlling individual lights within an lighting device for the filming period, the apparatus enables users to capture images using both chroma key lighting and ambient and incident lighting within the same recording period.

BRIEF DESCRIPTION OF THE DRAWINGS

In order to better understand various exemplary embodiments, reference is made to the accompanying drawings wherein.

DETAILED DESCRIPTION

Figure 1:
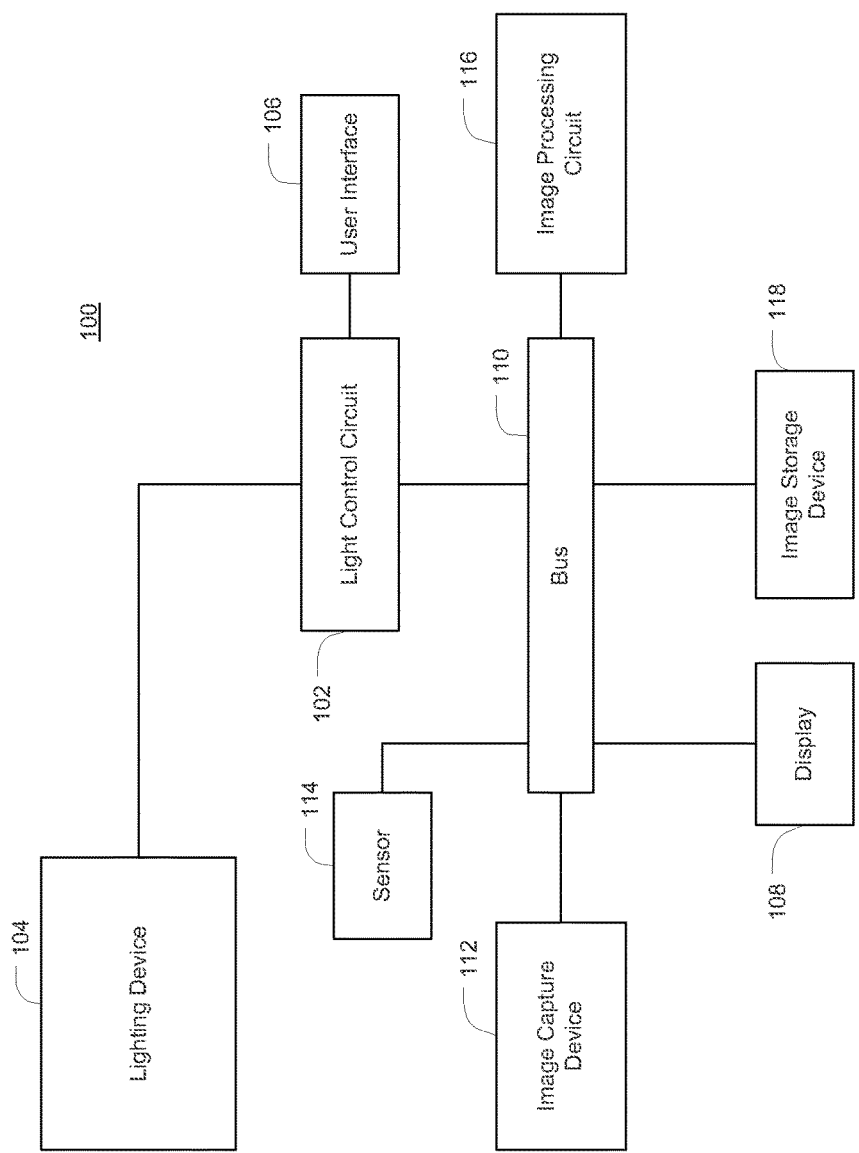
FIG. 1 illustrates a block diagram of an exemplary light control apparatus.

Referring now to the drawings, in which like numerals refer to like components or steps, there are disclosed broad aspects of various exemplary embodiments.

FIG. 1 illustrates a block diagram of an exemplary light control apparatus. Light control apparatus 100 can be used, for example, in image or video production to aid a user in making composite images and/or videos. Light control apparatus 100 can include a light control circuit 102, a lighting device 104, a user interface (UI) 106, a display 108, a bus 110, an image capture device 112, a sensor 114, an image processing circuit 116, and/or an image storage device 118. In some embodiments, multiple elements can be components in a single device. For example, image capture device 112, sensor 114, and display 108 can be in a single device, such as a digital video recorder. Similarly, light control circuit 102, user interface 106, and display 108 can be included in a single device.

Light control circuit 102 can include hardware to control each light in lighting device 104. In some embodiments, light control 102 can control multiple, discrete lighting devices 104 (not shown) in concert. Light control circuit 102 can send signals to control lighting device 104 via wired or wireless connection. Light control circuit 102 can control the functioning of each light in lighting device 104 through a controlled lighting sequence, which programs light characteristics of each light in lighting device 104 over a set period. Some light characteristics include, for example, the light plot (i.e., positioning of lights in a scene), color, focus, duration, brightness, quality (e.g., hard or soft), etc. In some embodiments, light control circuit 102 can receive feedback from sensor 114 and use the feedback to set light characteristics for lighting device 104.

In some embodiments, light control circuit 102 can include software to control characteristics of individual lights or light groups within lighting device 104. For example, light control circuit 102 can treat a light group as a skeuomorphic "spotlight", with the light group within lighting device 104 treated as a single entity with all the light characteristics of the group being controlled in tandem. In some embodiments, a user can select individual lights within lighting device 104 to control through light control circuit 102.

During operation, light control circuit 102 can receive a controlled lighting sequence either through user interface 106, or from image storage device 118 (e.g., database, video recording device, hard drive, etc.) via bus 110 and can use the controlled lighting sequence to control each light in lighting device 104 during a set period. In some embodiments, light control circuit 102 can generate and/or modify the controlled light sequence. The controlled lighting sequence can include one or more lighting profiles, such as a chroma key profile, an ambient light profile, and/or an incident light profile. The controlled lighting sequence can, for example, set and modify light characteristics of specific lights or light groups during filming to mimic different landscapes and can help light a subject correctly while the subject moves within the scene. For example, the viewed portion can display a chroma key profile, the unviewed portion can generally display an ambient light profile, while specific light groups in the unviewed portion can display an incident light profile. In some embodiments, light control circuit 102 receives feedback from one or more sensors 114 and can change light characteristics of one or more lights based on the received feedback.

In some embodiments, light control circuit 102 can determine the viewed and unviewed sections of lighting device 104. For example, light control circuit 102 can receive signals from one or more sensors 114 that can be used to determine the field of vision of image capture device 112. In such instances, light control circuit 102 can set the viewed section of lighting device 104 to correspond with only the lights that are in the field of vision of image capture device 112. Light control circuit 102 can also set all the lights outside of the field of vision of image capture device 112 as the unviewed section of lighting device 104. Light control circuit 102 can set specific light characteristics for specific sections of lighting device 104. For example, light control circuit 102 can set the viewed section of lighting device 104 to display a monochromatic, chroma key color, such as green or blue, while setting the unviewed section of lighting device 104 to display programmed ambient light or incident light, such as simulating sunlight through moving cloud cover.

In some embodiments, light control circuit 102 can change light characteristics of lighting device 104 based on image capture device 112. For example, if image capture device 112 is a film camera shooting at 48 frames per second (fps), light control circuit 102 can alternate characteristics of all lights in lighting device 104 between a chroma key color and a plurality of colors to simulate ambient light. When light control circuit 102 changes the lights this way, half of the filmed frames are filmed when lighting device 104 is displaying the chroma key color, while the other half of the scenes are filmed using the ambient light profile stored in the controlled lighting sequence (thus lighting the subjects using simulated ambient light). This enables a user to generate a composite image using ambient light on the subject, as the user can use the chroma key images to insert a new background in the chroma-keyed images while using the ambient light images to light the subject using the correct lighting profile. In some embodiments, light control circuit 102 can use genlocking to synchronize image capture device 112 and lighting device 104.

In some embodiments, light control circuit 102 can generate a controlled lighting sequence based on images it receives. In some embodiments, light control circuit 102 can receive one or more high-resolution images via bus 110 from image storage device 118 and can generate light characteristics for lighting device 104 to emulate the profile of the received images. For example, light control circuit 102 can receive images of a harvest moon sky and a moon-lit ground. Light control circuit 102 can generate a controlled lighting profile for sections of lighting device 104 such that lights in lighting device 104 above the subject emulate the sky, while lights in lighting device 104 below the subject emulate the ground.

In some embodiments, a user can modify the generated profile to control individual lights or light groups. For example, a user can edit the controlled lighting profile to change the color, intensity, and/or focus of the light to better light a subject in a simulated night scene. In some embodiments, light control circuit 102 can control lighting device 104 such that it does not emit the chroma key color. In such embodiments, light control circuit 102 can control lighting device 104 to specifically light a subject. For example, sensor 114 can detect shadow areas or other lighting issues within the viewed portion of image capture device 112.

Light control circuit 102 can then use the data received from sensor 114 via bus 110 to drive individual lights or light groups within lighting device 104 to address the lighting issue.

Lighting device 104 can include one or more lights that are controlled and driven by light control circuit 102. Each light in lighting device 104 can receive a control signal from light control circuit 102 and emits light based on the received control signal. In some instances, the control signal can alter the light over a set period and can change light characteristics like color and intensity and can control whether the light is on or off (e.g., "strobe effect").

In some embodiments, lighting device 104 can comprise an array of light-emitting diodes (i.e., an "LED array"). The LEDs, such as red-green-blue (RGB) or red-green-blue-white (RGB+W)-type LEDs, can be used in conjunction with other LEDs in a group to display multiple colors at a high resolution, depending on the resolution of LED array 104. In some embodiments, the LED array 104 can also include infrared LEDs. Light control circuit 102 can control the LED array 104 such that only those infrared LEDs within the viewed portion emit infrared light. In such instances, in lieu of the viewed portion emitting a chroma key color, image processing circuit 106 can use the detected infrared region to replace the background. When this occurs, the other RGB or RGB+W LEDs within the viewed portion can emit the ambient light.

In some embodiments, lighting device 104 can comprise a projector. In such embodiments, projector 104 can emit light onto one or more screens placed between projector 104 and image capture device 112. In such instances, light control device 102 can drive images that are projected through projector 104 onto one or more screens. In some embodiments, projector 104 emits a chroma key color within the viewed portion of image capture device 112. In some embodiments, projector 104 can include an infrared filter. In such instances, projector 104 can, in lieu of projecting a chroma key color, project infrared light only within the viewed portion of image capture device 112.

In some embodiments, lighting device 104 can comprise multiple groups of lights. For example, lighting device 104 can comprise six walls of lights surrounding a subject. Light control circuit 102 can control each of the six discrete walls separately. In some embodiments, light control circuit 102 can control smaller groups of lights or individual lights within a light group. For example, light control circuit 102 can control a group of lights on a "front wall" light group as a skeuomorphic front spotlight.

User interface (UI) 104 can include hardware and/or software that communicates between the user and light control circuit 102. In some embodiments, UI 104 can be a graphic user interface (GUI) that can display graphical representations of lighting device 104 and/or the frame being filmed by image capture device 112. In some embodiments, UI 106 and display 108 can be used by the user to generate and/or modify a controlled lighting sequence to be sent by light control circuit 102 to control light characteristics for one or more lights in lighting device 104. In some embodiments, the UI displays light groups within lighting device 104 as skeuomorphic lights within a light plot. A user can use UI 106 software to control such light groups like a single piece of lighting equipment. In some embodiments, UI 106 includes physical controls used to control one or more lights through light control circuit 102.

Display 108 can be a monitor that receives signals via bus from other devices in light control apparatus 100, such as image capture device 112, image processing circuit 116, UI 106, image storage device 118, and/or light control device 102, and displays an image based on the received signal. In some embodiments, light control apparatus 100 can include multiple displays 108, such as discrete displays for image capture device 112 and image processing device 116, respectively. Display 108 can be a liquid-crystal display (LCD) monitor or other digital display.

Bus 110 can be a line bus that facilitates communications between multiple devices in light control apparatus 100. In some embodiments, all devices controlled via bus 110 are in the same device. In some embodiments, devices in light control apparatus 100 can communicate wirelessly; in such instances, bus 110 can be replaced with a wireless communications apparatus.

Image capture device 112 can comprise, for example, a still camera or video camera that captures images or video lit by lighting device 104. In some embodiments, image capture device 112 can be within lighting device 104. For example, when lighting device 104 includes six walls of lights, image capture device can be within the six light walls with the subject.

In some embodiments, one or more sensors 114 can be included with image capture device 112 to determine the field of vision of image capture device 112. In such instances, sensor 114 in image capture device 112 can send a signal to light control circuit 102 that it then uses to set a viewed portion of lighting device 104. In some embodiments, image capture device 112 can send its characteristics (e.g., aperture, shutter speed, video frame rate, view angle, etc.) to light control circuit 102, which light control circuit 102 can use to generate or modify a controlled lighting sequence for lighting device 104.

Sensor 114 can be, for example, one or more internal sensors inside of image capture device 112 or light control circuit 102, or one or more external sensors positioned relative to image capture device 112 and lighting device 104. Sensor 114 can be, for example, a visible light sensor, infrared light sensor, and/or gyroscope that can be used to determine the field of vision of image capture device 102. In some embodiments, sensor 114 can be used to determine other quantitative measurements, such as light intensity, light temperature, room temperature, etc.

Measurements made by sensor 114 can be used by other devices in light control apparatus 100 to calibrate the controlled lighting sequence. In some embodiments, measurements made by sensor 114 can be used in maintenance and troubleshooting, such as when the light temperature is excessively high. In some embodiments, sensors 114 can be used to determine lighting issues within the visible portion of image capture device 112, such as detecting shadow areas on a subject. One or more sensors 114 can send the lighting data to light control circuit 102, which can change light characteristics of individual lights within lighting device 104 to change the detected shadow areas.

Image processing circuit 116 can include hardware to generate a composite image based on one or more images captured by image capture device 112. In some embodiments, image processing circuit 116 can generate a composite image based on an image received from image capture device 112 and an image retrieved from image storage device 118. In some embodiments, image processing circuit 116 can include software and/or a user interface (not shown) to enable a user to generate a composite image. In some embodiments, image processing circuit 116 generates the composite image in real time, receiving images from image capture device 112 as they are recorded. In some embodiments, image processing circuit 116 generates the composite image after all images were recording, retrieving both the images recorded by image capture device 112 using lighting device 104 and other images from image storage device 118.

In some embodiments, generation of a composite image is aided based on the lighting device 104. For example, image capture device 112 can record an image with a chroma key background (e.g., the viewed portion of lighting device 104) while the subject is lit with ambient light. Image processing circuit 116 can retrieve another image (in some instances, from image storage device 118) and can replace the chroma key color in the recorded image of image capture device 112 with the other, retrieved image to generate the composite image. In such instances, the subject in the composite image is lit with ambient light even though chroma keying was used to replace the background in the image.

In some embodiments, image processing circuit 116 can merge two images recorded by image capture device 112. For example, the controlled lighting sequence drives lighting device 104 such that it alternates between displaying a chroma key color for half of the recorded frames and displaying ambient light for the remaining half of recorded frames. Image processing circuit 116 can merge consecutive images together through a process like genlocking such that the composite image is lit with ambient light even though chroma keying was used to enable image processing circuit 116 to replace the background in the image.

Image storage device 118 can be one or more databases, hard drives, video recording devices, and/or other media storage devices that store information for other devices in light control apparatus 100. In some embodiments, image storage device 118 stores images and/or video that light control circuit 102 uses as a reference when generating a controlled lighting sequence, such that lighting device 104 emulates playback of the stored image or video. For example, a user can upload high-resolution photographs and/or video to image storage device 118. Light control circuit 102 can then use the stored images and/or videos to generate a controlled lighting program for playback through lighting device 104 as ambient light emulating the stored media.

In some embodiments, users can download reference images onto image storage device 118 based on entered global positioning system (GPS) coordinates. For example, a user can enter coordinates {36.115369, −115.172761} and {36.121852, −115.171816} to retrieve multiple images between the two coordinates representing "The Strip" in Las Vegas. Multiple images and/or video can be stored in image storage device 118. Light control circuit 102 can then retrieve the stored images and/or videos to generate a controlled lighting program for playback through lighting device 104 as ambient light emulating the stored media.

In some embodiments, image storage device 118 stores the images recorded by image capture device 112 and/or composite images generated by image processing circuit 116. In such instances, image storage device 118 can also store the original images used by image processing unit 116 to generate the composite images.

Figure 2:
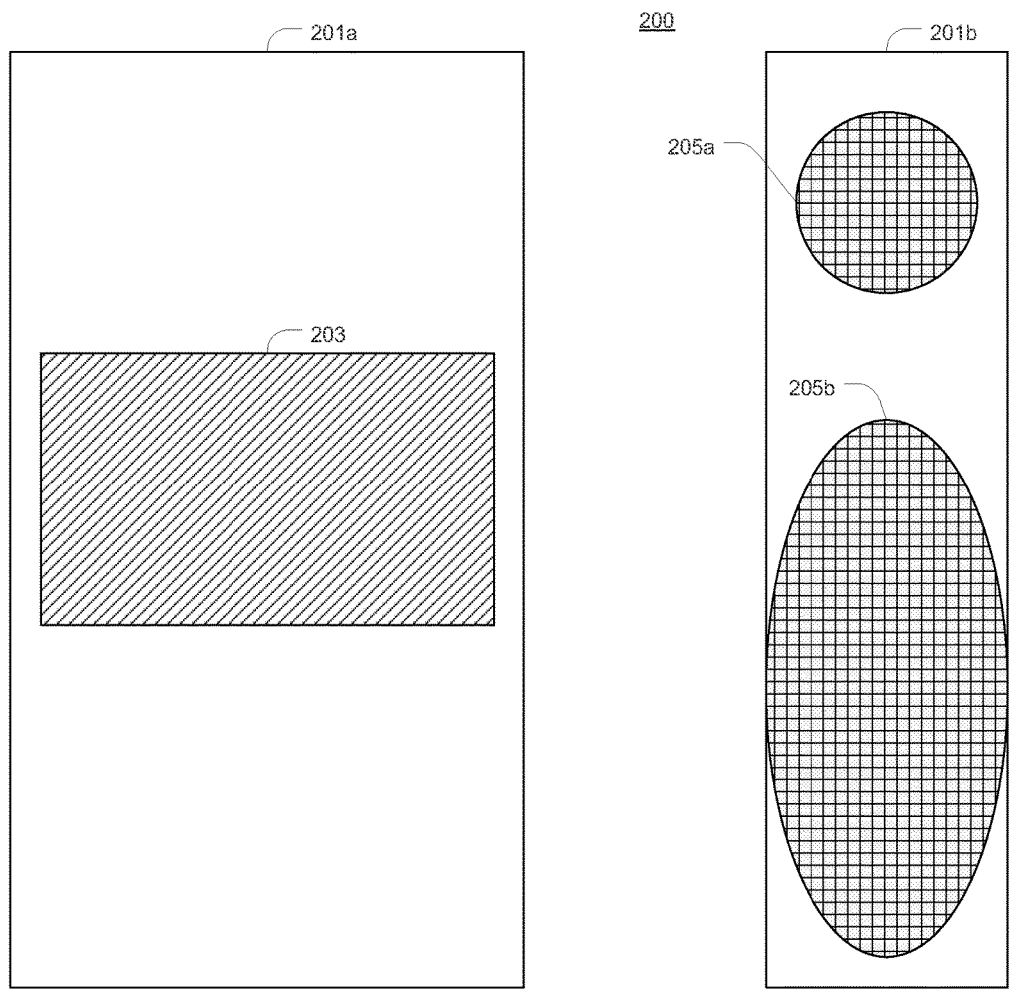
FIG. 2 illustrates an exemplary light-emitting diode array.

FIG. 2 illustrates an exemplary lighting device. Lighting device 200 includes light wall sections 201a-b, viewed light portion 203, and programmed light sections 205a, 205b. In some embodiments, lighting device 200 can also include other wall sections (not shown) to surround a subject when capturing and image or video. For example, lighting device can include back wall portion 201a, front wall portion 201b positioned next to image capture device 112, a ceiling portion (not shown) above wall portions 201a-b, a ground portion (not shown), and image capture device 112.

Viewed light portion 203 is the portion of lighting device 200 that is in the field of vision of image capture device 112. In some embodiments, sensor 114 can make measurements that image capture device 112 and/or light control circuit 102 use to determine viewed portion 203 within lighting device 200. In some embodiments, image capture device 112 and/or light control circuit 102 can determine changes in the field of vision of image capture device 112 and modify the lights included in viewed portion 203. In some embodiments, light control circuit 102 can specifically control viewed portion 203 relative to lighting device 200 such that all the lights in viewed portion 203 display a chroma key color, while all other lights in lighting device 200 display ambient light based on an ambient light profile included in the controlled light sequence.

Programmed light sections 205a, b can be sections of lights within lighting device 104 that are specifically controlled by light control circuit 102 as a group. For example, light section 205a can be controlled together as a skeuomorphic spotlight and light section 205a can be controlled together as a specific geometric shape. In some embodiments, light section 205a can be as small as a single light or LED.

Users can control light section 205a, b within lighting device 200 to employ greater lighting control beyond a programmed light sequence based on a reference background image by using light sections to generate incident light on objects within the frame. For example, a user can add a light plot to the controlled lighting sequence and can control light characteristics of each skeuomorphic light within the light plot. When using the light plot, a controlled light sequence can be programmed such that for lighting device 200, all lights that are not in viewed section 203 or light sections 205a-b are displaying a programmed sequence of ambient light, viewed section 203 is displaying a chroma key color, and light sections 205a-b are displaying white lights to emulate spotlights. Image capture device 112 can then capture an image that specifically lights a subject in accordance with artistic lighting conventions, while also lighting the subject and other objects with appropriate ambient light and having a chroma key background light for post-production editing to create a composite image.

Figure 3:
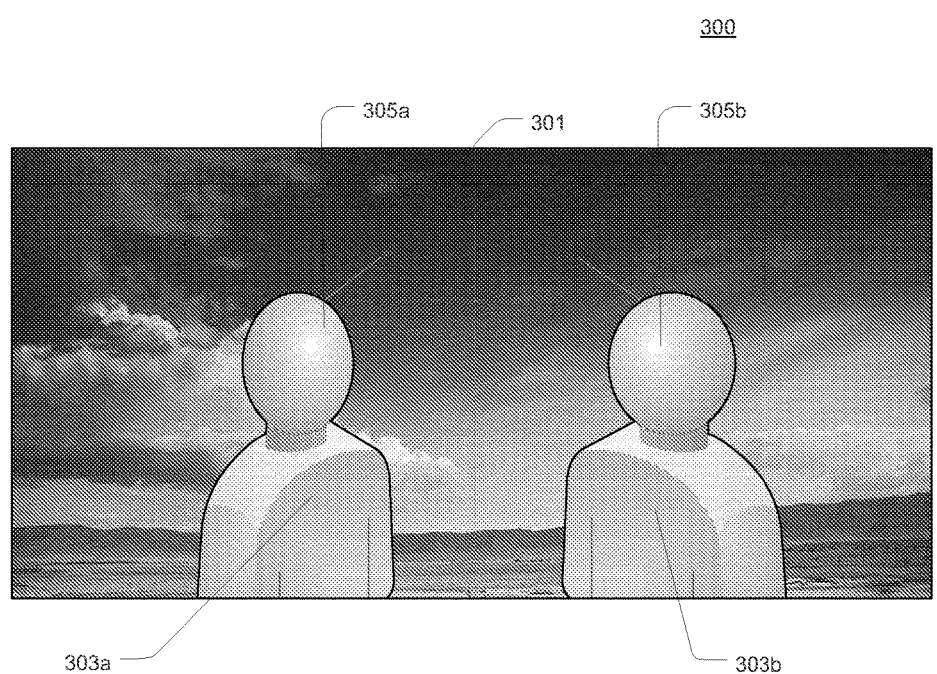
FIG. 3 illustrates an exemplary image employing an embodiment of the light control apparatus.

FIG. 3 illustrates an exemplary image employing an embodiment of the light control apparatus. Composite image 300 can be generated, for example, by image processing circuit 116 based on a background image stored in image storage device 118 and a recorded image of subjects using lighting device 104 and image capture device 112. Composite image 300 includes a background image 301, subjects 303a, b and specific subject lighting 305a, b.

Background image 301 can be, for example, an image replaced by image processing circuit 116 during post-production to replace a chroma key color background 203 generated by lighting device 104, 200. In some embodiments, background image 301 can be a high-resolution image displayed by lighting device 104 during specific frames of a controlled lighting sequence driven by light control circuit 102. For example, projector 104, 200 can display a high-resolution image or video onto wall portion 201a, with the viewed portion 203 being captured as background image 301.

Subjects 303a, b can be between light wall 201a and image capture device 112 during recording and can be subject to reflections of light made by all lights in lighting device 200. In some instances, subjects 303a, b can reflect light based on the display of lights in lighting device 200.

The subject reflection 305a, b can be reflections of ambient light displayed by lighting device 104, such as non-viewed portions of lighting device 104 and skeuomorphic spotlights 205a, b. In some embodiments, subject reflections 305 a, b can be initial shadow areas detected by sensor 114. Light control circuit 102 can generate an incident lighting profile within the controlled lighting sequence that controls one or more lights in lighting device 104 to address the detected shadow region. In some embodiments, subject reflections 305a, b are captured in one frame, while a chroma-keyed image is captured in another frame. Image processing circuit 116 can merge the two frames to produce a composite image 300 that replaces the chroma key background with background 301 while maintaining the subject reflections 305a, b from the ambient light frame.

Figure 4:
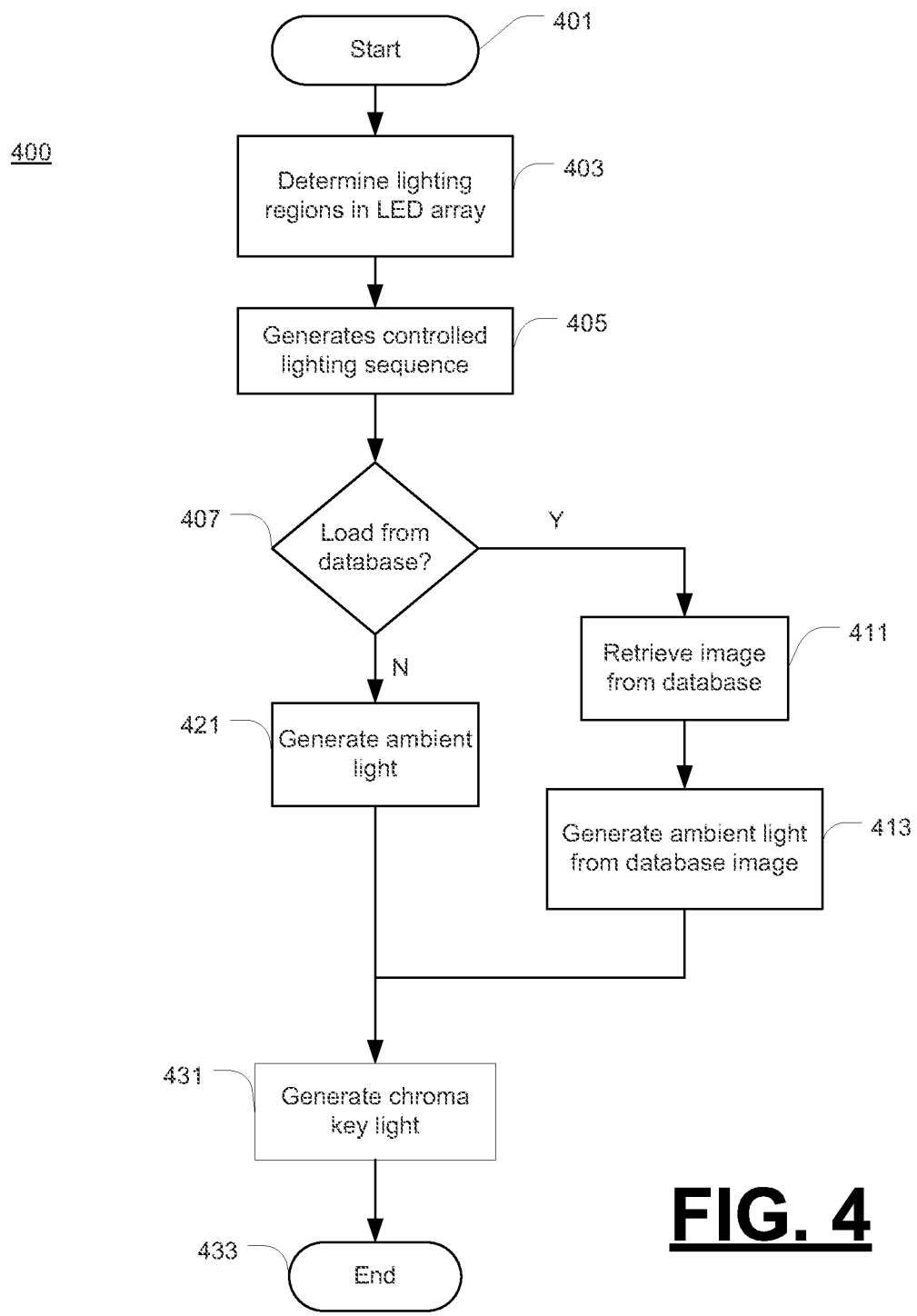
FIG. 4 illustrates a flowchart for lighting a scene using an embodiment of the light control apparatus.

FIG. 4 illustrates a flowchart for lighting a scene using an embodiment of the light control apparatus. Light control apparatus 100 or light control circuit 102 can employ method 400 to generate a controlled light sequence and control lighting device 104, 200 when recording an image or video for later post-production editing. Method 400 can start at step 401 and proceed to step 403, where light control circuit 102 can determine lighting regions in lighting device 104, 200. In some embodiments, the lighting regions include viewed portion 203 and/or light sections 205a, b that comprise a light plot within lighting device 104, 200. In some embodiments, specific lighting regions may change over the period of the controlled lighting sequence, such as when image capture device 112 moves during recording period. In such instances, light control circuit 102 determines the specific lights included within each lighting region over each step (i.e., "route") and set the lighting regions for each frame to be filmed over the set period.

Once the lighting regions for lighting device 104, 200 are set, light control circuit 102 can then proceed to step 405, where it generates a controlled lighting sequence. In some embodiments, light control circuit 102 can receive instructions from the user via UI 106 when producing the controlled lighting sequence. The controlled lighting sequence can include, for example, light characteristics for ambient light (i.e., "ambient light profile"), chroma key lighting settings, light sections for a light plot, skeuomorphic light settings, and other lighting characteristic settings for each light over every frame in the set period.

After generating the controlled lighting sequence, light control circuit in step 102 can proceed to step 407, where it determines whether to load images or video from DB 118. In some embodiments, light control circuit 102 can generate or modify the ambient light profile to represent a route generated from reference images or photographs, such as images saved in DB 118 or a set or sequence of GPS coordinates with associated landscape images stored by a third-party. If light control device 102 determines to load an image from DB 118 or from GPS coordinates, it proceeds to step 411, where it retrieves an image from DB 118. In some embodiments, light control device 102 retrieves images from a third-party database, such as a database of images based on GPS coordinates.

After retrieving the image, light control circuit in step 413 can drive the lighting device 104, 200 to generate ambient light based on the loaded image. Light control circuit can, for example, control lighting device 104, 200 to display ambient light in the unviewed portions of lighting device 104, 200. In some embodiments, the loaded image modifies the controlled lighting sequence generated in step 405.

If, in step 407, light control circuit 102 determines not to load an image from a database, it proceeds to step 421, where it drives lighting device 104, 200 to generates ambient light. In instances where light control circuit 102 does not generate ambient light based on a stored image, light control circuit 102 can generate ambient light, for example, based on the controlled lighting sequence generated in step 405.

After either step 413 or 421, light control circuit can proceed to step 431, where it drives lighting device 104, 200 to generate a chroma key light. In some embodiments, the chroma key light generated is only for viewed portion 203 of lighting device 104, 200. In some embodiments, light control circuit 201 drives lighting device 104, 200 to alternate between displaying the ambient light generated in step 413 and the chroma key light generated in step 431. Once the chroma key light is generated, light control circuit 102 can proceed to step 433 to end method 400.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of recording video, comprising:
displaying, on a viewed portion of a display having a plurality of multi-color pixels, information from a direct-view source;
displaying, on an unviewed portion of the display, information from an ambient source; and
recording a video of a scene with a video capture device having a field of vision, wherein the viewed portion of the display is in the field of vision of the video capture device and the unviewed portion of the display is outside of the field of vision of the video capture device, wherein the unviewed portion emits light that creates ambient light effects in the scene for recording by the video capture device;
wherein the displaying information from the direct-view source includes displaying video for recording by the video capture device and alternating between display of the video and displaying at least one of information from the ambient source, a chroma key color, or infrared light.

2. The method of claim 1, wherein the displaying of the ambient source is designed to create ambient light reflections in the scene that emulate the ambient source.

3. The method of claim 1, further comprising:
receiving a signal from a sensor;
determining a field of vision of the video capture device based on the signal; and
identifying ones of the plurality of pixels that are within the field of vision of the video capture device for defining the viewed portion of the display.

4. The method of claim 3, further comprising identifying ones of the plurality of pixels outside of the field of vision of the video capture device for defining the unviewed portion of the display.

5. The method of claim 3, wherein the signal is at least one of a video capture device aperture setting signal, shutter speed signal, a video frame rate signal, a view angle signal, a movement signal, or location signal.

6. A method of recording video, comprising:
displaying, on a viewed portion of a display having a plurality of multi-color pixels, information from a direct-view source;
displaying, on an unviewed portion of the display, information from an ambient source;
recording a video of a scene with a video capture device having a field of vision, wherein the viewed portion of the display is in the field of vision of the video capture device and the unviewed portion of the display is outside of the field of vision of the video capture device, wherein the unviewed portion emits light that creates ambient light effects in the scene for recording by the video capture device;
receiving a signal from a sensor;
determining a field of vision of the video capture device based on the signal; and
identifying ones of the plurality of pixels that are within the field of vision of the video capture device for defining the viewed portion of the display.

7. The method of claim 6, wherein the displaying of the ambient source is designed to create ambient light reflections in the scene that emulate the ambient source.

8. The method of claim 6, wherein the displaying information from the direct-view source includes displaying video for recording by the video capture device.

9. The method of claim 8, wherein the displaying information from the direct-view source further includes alternating between display of the video and displaying at least one of information from the ambient source, a chroma key color, or infrared light.

10. The method of claim 6, further comprising identifying ones of the plurality of pixels outside of the field of vision of the video capture device for defining the unviewed portion of the display.

11. The method of claim 6, wherein the signal is at least one of a video capture device aperture setting signal, shutter speed signal, a video frame rate signal, a view angle signal, a movement signal, or location signal.

* * * * *